Jackson Eng    Inventor

By *Richard N. Nagel*   Attorney

June 19, 1962 J. ENG 3,039,953
SELECTIVE CONVERSION OF NORMAL PARAFFINS
WITH A CRYSTALLINE ZEOLITE
Filed Sept. 17, 1958 4 Sheets-Sheet 3

Jackson Eng  Inventor

By Richard H. Nagel Attorney

TREATING 560/658 °F. VIRGIN GAS OIL WITH
HYDROGEN CHLORIDE MODIFIED 5A SIEVES

Jackson Eng   Inventor

By *Richard N. Hoze* Attorney 3,039,953
SELECTIVE CONVERSION OF NORMAL PARAFFINS WITH A CRYSTALLINE ZEOLITE
Jackson Eng, Sarnia, Ontario, Canada, assignor to Esso Research and Engineering Company, a corporation of Delaware
Filed Sept. 17, 1958, Ser. No. 761,624
7 Claims. (Cl. 208—26)

The present invention relates to a process for separating and segregating straight chain hydrocarbons from mixtures thereof with branched chain and/or cyclic or aromatic hydrocarbons. More particularly, the present invention relates to the selective adsorption of relatively straight chain, normal hydrocarbons from isomeric branched chain and cyclic compounds employing a class of natural or synthetic adsorbents termed, because of their ability to separate molecules on the basis of size, "molecular sieves." Still more particularly, the present invention relates to an improved desorption process whereby the hydrocarbon adsorbed on the sieve is recovered in a manner considerably more efficient and economical than hitherto found possible. In a preferred embodiment, the present invention relates to a manner for controlling the length of the adsorption cycle.

It has been known for some time that certain zeolites, both naturally-occurring and synthetic, have the property of separating normal from isomeric branched chain hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 Angstrom units to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites, analcite, and mordenite. A synthetic zeolite with molecular sieve properties is described in U.S. 2,442,191. Zeolites vary somewhat in composition, but generally contain silica, aluminum, oxygen, and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula

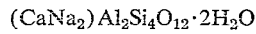
$(CaNa_2)Al_2Si_4O_{12} \cdot 2H_2O$

Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to adsorb a straight-chain hydrocarbon and exclude the branched chain isomers, are described in an article "Molecular Sieve Action of Solids," appearing in Quarterly Reviews, vol. III, pp. 293–330 (1949), and published by the Chemical Society (London).

The separation of normal from branched chain or aromatic hydrocarbons or mixtures, either for the purpose of enriching the mixture in branched chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branched chain substituent of the same number of carbon atoms. Many other examples may be cited.

Despite the excellent selective adsorption properties of molecular sieves, certain difficulties have been encountered in attempting to apply them to the large scale removal of normal paraffin hydrocarbons from branched chain and cyclic hydrocarbons. In using such adsorbents, it is necessary to employ a two-step cyclic process. The normal paraffins must first be selectively adsorbed upon the molecular sieve. Usually this is accomplished by contacting the oil with the adsorbent at temperatures in the range of from about 100° to about 600° F. and at pressures of from about atmospheric to about 100 p.s.i.g. Following this adsorption step, the molecular sieve must next be reactivated by a desorption step before it can be used for adsorption again. The desorption step is usually carried out by steaming the used adsorbent, evacuating it, or displacing the adsorbed compounds by means of a gas which is not itself adsorbed by the sieve. The capacity of molecular sieve adsorbents when used in this manner is very low and therefore such cyclic processes are relatively expensive because of the frequency with which the sieve must be desorbed. The desorption methods available are only partially effective and the selectivity and capacity of the sieve rapidly decline as it is used. A further difficulty is that carbonaceous deposits rapidly build up on the surface of the sieve. Regeneration of the sieve at frequent intervals by heating it to very high temperatures or by employing other regenerative techniques alleviates this latter difficulty to some extent but very frequent regeneration shortens the active life of the sieve. Because of these difficulties, the cost of effecting separations between hydrocarbons by means of molecular sieves is inordinately high.

A new and improved method for eliminating normal paraffins from hydrocarbon oils by means of molecular sieves which is free from many of the disadvantages associated with molecular sieve processes employed in the past has been proposed. The process differs from prior processes in that molecular sieves are employed to effect chemical conversion of the normal paraffins upon a selective basis, rather than merely a mechanical separation. It has been found that normal paraffins present in a hydrocarbon oil can be selectively converted to olefins by contacting the oil with a molecular sieve having pore diameters of about 5 A. under critical conditions. It is believed that the explanation for this selective conversion phenomenon lies in the fact that gas phase configurations are not possible in the pores of molecular sieves. It is impossible for a normal paraffin molecule to rotate in the 5 A. pores of a molecular sieve except on its longitudinal axis and therefore the rotations corresponding to the three main moments of inertia of the molecule become vibrations as the molecule is occluded in the sieve. This results in a high loss in energy of the molecule over an extremely short period of time. By providing the molecule with a sufficiently high initial energy, it is possible to use this energy loss to effect rupture of bonds in the molecule and convert the normal paraffins into lower molecular weight olefins before complete occlusion takes place. The olefins are not retained by the sieve but instead are recovered with the nonadsorbed isoparaffins and cyclic compounds in the oil.

Regardless of the theoretical explanation for the phenomenon which takes place, this process has numerous advantages over processes which have been proposed for the removal of normal paraffins from hydrocarbon oils and particularly wax molecules from oils, by means of molecular sieves in the past. Since the normal paraffins which would otherwise be occluded by the sieve are continuously converted to olefins which are not retained on the sieve, the pores of the sieve remain relatively free of hydrocarbons. A desorption step is necessary only at much longer time intervals, and the difficulties encountered in desorbing the sieve in prior processes are thus avoided. Olefins formed in the process can readily be separated from saturated constituents in the oil and form a valuable by-product. The simplified procedure and equipment employed make the process considerably more attractive from an economic standpoint than processes utilized heretofore.

Molecular sieve adsorbents suitable for use in the process of the invention are available commercially and may be produced in a number of ways. One suitable process for preparing such adsorbents involves the mixing of sodium silicate, preferably sodium metasilicate, with sodium aluminate under carefully controlled conditions. The sodium silicate employed should be one having a ratio of soda to silica between about 0.8 to 1 and about 2 to 1. Water glass and other sodium silicate solutions having lower soda to silica ratios do not produce the selective adsorbent crystals unless they are subjected to extended heat soaking or crystallization periods. Sodium aluminate solutions having a ratio of soda to alumina in the range of from about 1 to 1 to about 3 to 1 may be employed. High soda to alumina ratios are preferred and sodium aluminate solutions having soda to alumina ratios of about 1.5 to 1 have been found to be eminently satisfactory. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1.

These reactants are mixed in a manner to produce a precipitate having a uniform composition. A preferred method for combining them is to add the aluminate to the silicate at ambient temperatures using rapid and efficient agitation to produce a homogeneous mixture. The mixture is then heated to a temperature of from about 180° to about 215° F. and held at that temperature for a period of from about 0.5 to about 3 hours or longer. The crystals may be formed at lower temperatures but in that case longer reaction periods are required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The crystals prepared as described above have pore diameters of about 4 A. units. To convert these to crystals having 5 A. pores, it is necessary to employ a base exchange reaction for the replacement of some of the sodium by calcium, magnesium, cobalt, nickel, iron or a similar metal. Magnesium, cobalt, nickel and iron have greater cracking activity than does calcium and therefore it will often be preferred to employ solutions of these metals for replacement purposes.

The base exchange reaction may be carried out by water washing the sodium alumino-silicate crystals and adding them to a solution containing the desired replacement ions. An aqueous solution of magnesium chloride of about 20% concentration, for example, may be used for preparation of the magnesium form of the 5 A. sieve. After a contact time which may range from about 5 minutes to about an hour, the 5 A. product is filtered from solution and washed free of the exchange liquid. About 50 to 75% of the sodium in the crystals is normally replaced during the base exchange reaction.

The crystals thus prepared are in a finely divided state and are usually pelleted with a suitable binder material before they are calcined in order to activate them. Any of a number of binder agents used in the manufacture of catalysts may be employed for this purpose. A binder consisting of bentonite, sodium silicate and water, for example, has been found satisfactory. In using this binder, the constituents should be mixed so that the product contains from about 5 to 10% bentonite, 5 to 15% sodium silicate and about 75 to 90% of the crystals on a dry basis and that the total mixture contains about 25 to 35% water. This mixture may then be extruded into pellets or otherwise shaped and subsequently dried and calcined. Calcination temperatures of from about 700° to about 900° F. or higher are satisfactory.

In carrying out the separation process, the feed stream is contacted with the molecular sieve adsorbent in vapor phase at a temperature of from about 800° to about 1000° F. At temperatures below about 800° F. little conversion takes place and therefore removal of normal paraffins from the oil is low. At temperatures above about 1000° F. considerable thermal cracking of isoparaffinic and cyclic constituents of the oil takes place and hence much of the selectivity of the process disappears. Contacting temperatures of from about 800° to 900° F. are most effective and a temperature of about 850° F. is particularly preferred.

The pressures employed in contacting the oil with the adsorbent may range from about 50 mm. of mercury to about 150 p.s.i. Generally it is preferable to carry out the contacting step at about atmospheric pressure. The feed rate employed may range from about 0.1 to about 3 pounds of oil per pound of molecular sieve per hour. Preferred rates range between 0.1 and 1.0 pound per pound per hour. Under these conditions, normal paraffins present in the oil will be selectively converted to lower boiling olefins which are not retained upon the sieve and instead are discharged with the product oil. These olefins may be readily separated from the oil and constitute a valuable by-product of the process.

Although the olefins formed by the selective conversion of normal paraffins in the process are not retained upon the sieve, deposits gradually build up on the sieve surface, probably due to polymerization of the olefins. Sulfur compounds, water and other contaminating materials present in the feed may also contribute to the gradual accumulation of such deposits. In order to remove these deposits and maintain the activity of the adsorbent at a high level, the sieve is regenerated at suitable intervals. Although steam and other regeneration procedures heretofore disclosed may be employed in this step of the process, it is normally preferred to regenerate the sieve by passing a stream of oxygen-containing gas through the sieve bed at high temperatures. In the presence of the oxygen, the deposits are burned from the surface of the sieve and the sieve activity is restored. The quantity of oxygen required for this burning step is small, since the total amount of foreign matter on the sieve is small, and therefore gas streams containing as little as 5% oxygen may be used. It is preferred, however, to employ air for this purpose. The air or other gas stream used in the regenerative step may be preheated to a temperature of from about 500° to about 800° F. before contacting it with the sieve. The high temperature zone formed by combustion of the deposits upon the sieve surface proceeds through the adsorbent mass rapidly and exists at any one spot for only a brief instant. It has been found that the sieve crystals are not appreciably impaired by this regenerative treatment.

In order to further minimize deposit formation and reduce the frequency of regeneration, it is often advantageous to contact the feed stream with a guard bed of alumina, silica gel or a similar adsorbent prior to introducing it into the treating zone. Polar contaminants in the feed are removed by the guard bed and hence the formation of deposits within the treating zone is reduced. The guard bed may be regenerated by burning or other conventional techniques.

In order to further reduce deposit formation within the treating zone, it is preferred to carry out the process in the presence of added hydrogen, nitrogen, carbon dioxide or a similar gas having a molecular diameter smaller than the pore diameter of the sieve. The presence of such a gas serves to purge hydrocarbon fragments from the pores of the molecular sieve and prevent the reaction of such fragments to form carbon and polymeric deposits. Hydrogen is particularly preferred for this purpose because it may also result in saturation of some of the olefins produced and thus further reduce deposit formation. The use of hydrogen is particularly effective in the presence of metallic alumino-silicate adsorbents which have some hydrogenation properties. The nickel form of 5 A. molecular sieve, for example, tends to cause hydrogenation of the olefin to a greater degree than does the calcium form and therefore deposit formation is reduced. The gas employed may be introduced with the feed at a rate such that its concentration in the reactor ranges from about 5 to about 95 mole percent.

The oils adapted for treatment in accordance with the process of the invention may in general be defined as hydrocarbon oils boiling in the range between about 100° to about 750° F. and especially between 230° and 650° F. Such oils include naphthas, kerosene (boiling between 320° and 555° F.) and middle distillates and are widely used for the production of gasolines, jet fuels, diesel fuels, heating oils and similar products wherein the content of normal paraffins must be limited to control undesirable effects such as solidification in storage at low temperature. The process of the invention is particularly effective for removing wax and similar normal paraffinic constituents from middle distillate petroleum fuels in order to reduce their pour point, cloud point and haze point, and it is in this area that the process of the invention will find widest application.

The process described above is particularly effective in extending the time between adsorption and desorption when wax-containing feeds are treated. The chemical conversion of wax by the sieve rather than its retention within the sieve pores greatly extends the scope and capacity of such a bed. Nonetheless, after a period on the adsorptive cycle, the sieve gradually loses capacity, and this is reflected by a gradual increase in the pour point of the dewaxed oil. However, pour points cannot be quickly determined on the oil, and thus their determination is not a suitable means for controlling the sorptive cycle. Were the wax sorbed without cracking or thermal conversion, the gradual saturation of the bed could be readily followed by measuring the temperature rise in each section of the bed as the adsorption front moves through it. However, when selective wax conversion occurs, during adsorption, there is no temperature rise in any section of the sieve bed.

It is the principal object of the present invention to set forth a means for readily following the progress of the saturation of a molecular sieve adsorption process when conversions of the wax occurs.

It has now been found that the rate of saturation of the sieve bed under selective wax cracking conditions can readily be followed by measuring the rate of hydrocarbon "make" gas. It has been found that as the pour point reduction of the treated oil decreased, the amount of hydrocarbon gas make also decreases. When the gas make rate has leveled off, there is likewise no further reduction in pour point, i.e. the sieve has become saturated, and the desorptive regeneration part of the cycle now is employed.

The exact nature and objects of the invention may be more readily understood by referring to the following detailed description of a preferred embodiment of the process, to the examples set forth hereafter, and to the attached drawings in which.

Figure 3:
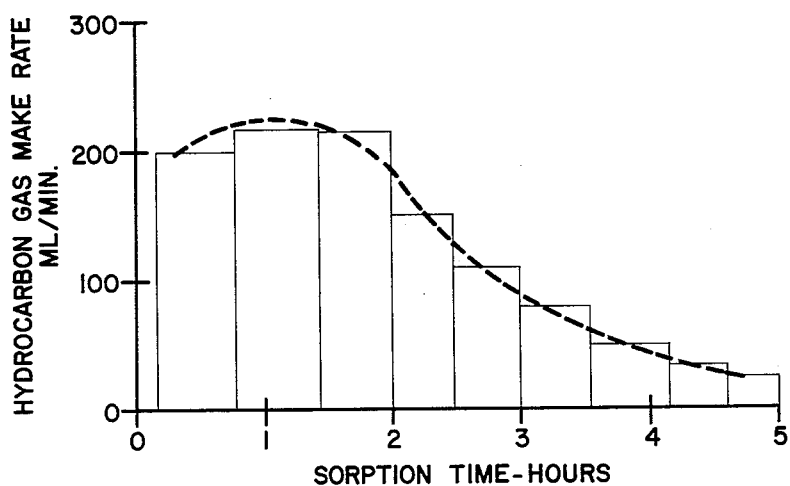
Figure 4:
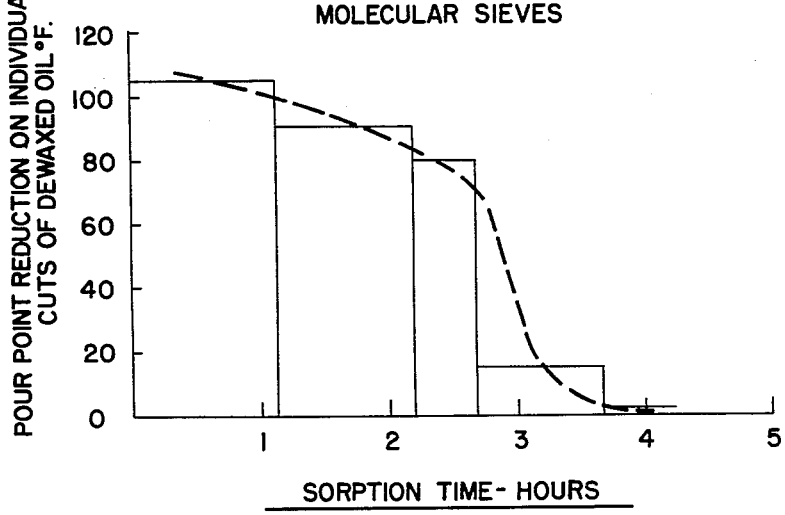
Figure 4:
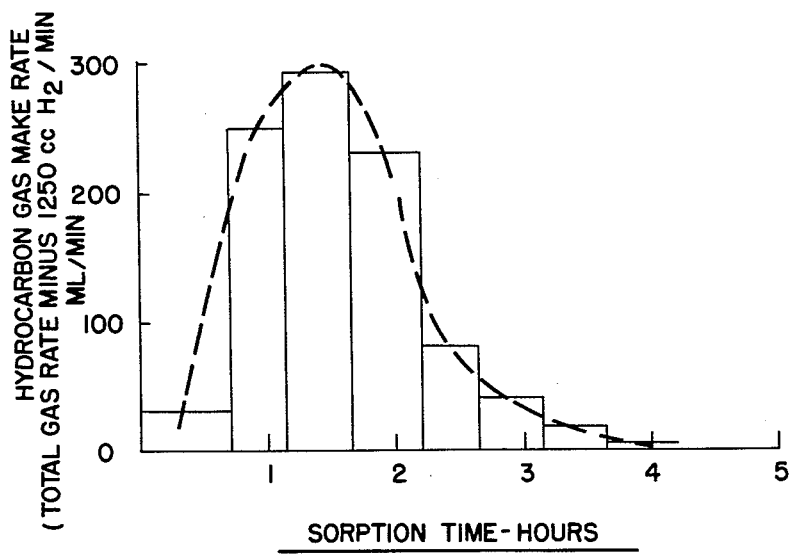
Figure 5:
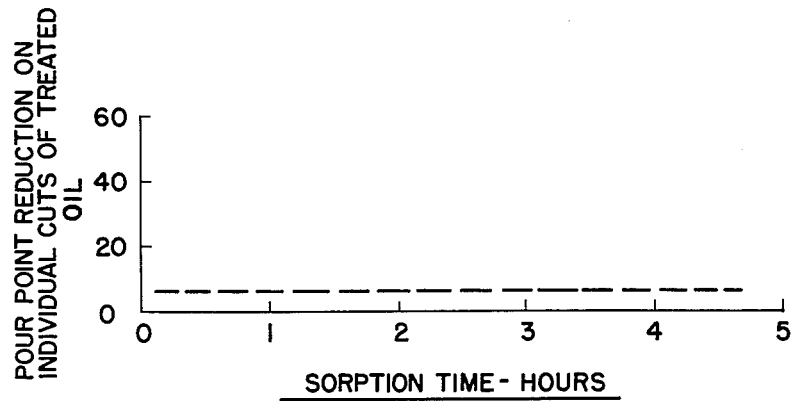
Figure 5:
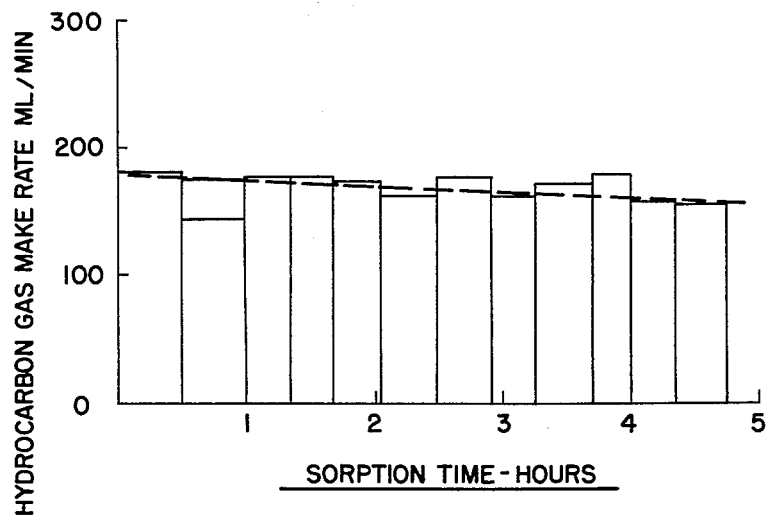

FIGURE 3 is a graphical representation of data illustrating the effect of contacting time upon the rate of hydrocarbon make gas production; and FIGURES 4 and 5 are graphical illustrations of the data in Examples 1 and 2 relating the gas make rate with sorption time of 5 Angstrom molecular sieves (FIGURE 4) and hydrogen chloride modified 5 Angstrom sieves (FIGURE 5).

Figure 1:
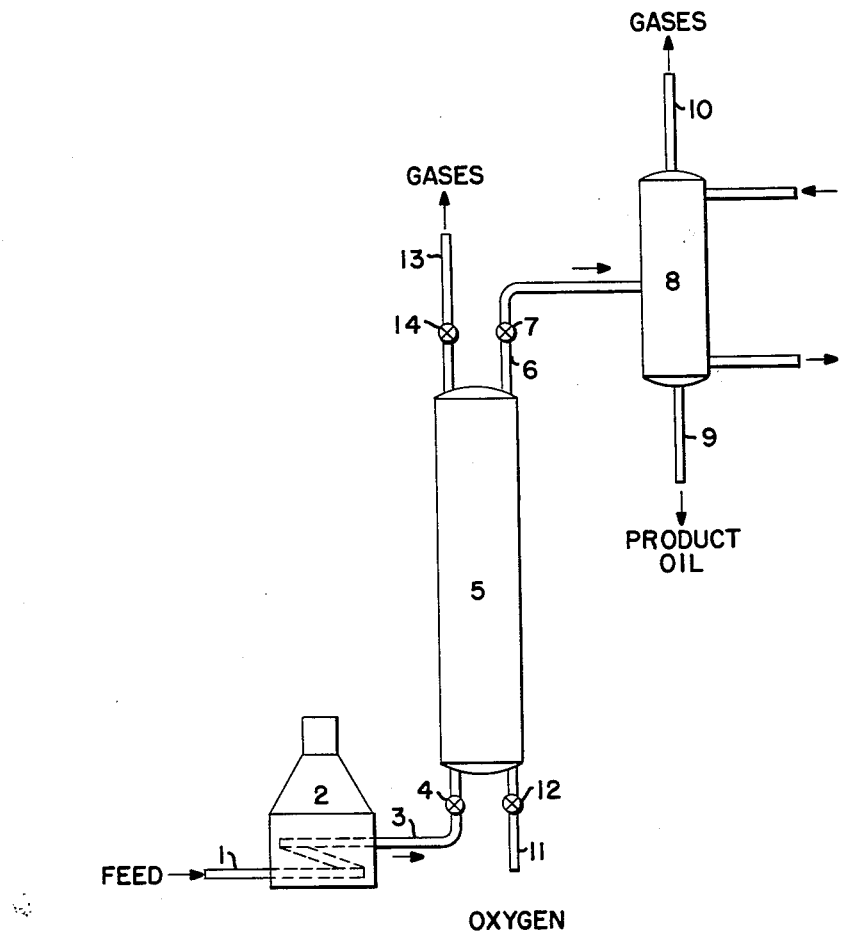
FIGURE 1 depicts a flow diagram of a preferred embodiment of the process of the invention.

Referring now to FIGURE 1, a hydrocarbon oil containing normal paraffins as well as isoparaffinic and cyclic compounds, a gas oil boiling in the range of from about 450° to about 700° F., for example, is introduced through line 1 into furnace 2 where it is preheated to a temperature of about 850° F. The preheated feed, now in vapor phase, is passed through line 3 and valve 4 into contacting zone 5. Hydrogen or a similar gas having a molecular diameter less than 5 Angstrom units may be introduced with the vaporized feed into zone 5. The contacting zone has disposed therein a bed of molecular sieve having uniform pore diameters of 5 A. units. The contacting zone may be fitted with suitable jacketing, heat coils or similar means for controlling temperature within the bed. The feed stream passes upwardly through the adsorbent bed and in so doing, normal paraffins present therein are selectively converted to lower molecular weight olefins. Some light gases are also formed. The vapor stream after contact with the adsorbent is removed overhead from contacting zone 5 through line 6 containing valve 7 and is passed to condenser 8. In the condenser, hydrocarbons boiling above about 100° F. are condensed and taken off as a bottoms product through line 9. Uncondensed gases are removed overhead through line 10. The product oil recovered through line 9 may be further fractionated to remove constituents boiling below the feed boiling point if desired. The overhead gas stream may be passed to a light ends plant for separation and recovery of the individual gaseous constituents.

The contacting procedure described above is continued until the rate of light hydrocarbon gas formation, as determined by analysis of product stream withdrawn through line 10, has become substantially zero or has leveled off at a very low rate of about 10 to 50 cc./min. In accordance with the present invention, the sieve has now become saturated with wax and other carbonaceous deposits, and the desorptive regeneration part of the cycle follows.

Introduction of the feed stream is therefore halted and following nitrogen or other inert gas, air or other oxygen containing gas is introduced into the bottom of contacting zone 5 through line 11 containing valve 12. The gas stream should be preheated to a temperature of from about 500° to 800° F. This may be accomplished in a suitable furnace, not shown. Under the temperature conditions prevailing within the sieve bed, oxygen in the gas stream combines with the deposits on the sieve surface and the deposits are burned off. The combustion takes place within a narrow zone which moves from the bottom of the bed to the top of the bed. At any instant the temperature within the combustion zone may range from 1000° to 1500° F. but because of the short time during which these temperatures prevail at any level in the bed, crystallinity of the sieve is not materially affected. Gases are removed overhead from the contacting zone through line 13 containing valve 14. Upon completion of the regenerating step of the process, valves 12 and 14 may be closed and valves 4 and 7 opened to permit resumption of the contacting step. Although only one contacting vessel is shown in FIGURE 1, it will be understood that in most cases it will be advantageous to employ two or more vessels suitably connected in parallel to permit regeneration of the spent sieve without interruption of the process. The arrangement of such vessels will be obvious to those skilled in the art.

The process of the invention is further illustrated by the following examples.

Example 1

A 560/658° F. boiling range gas oil from Western Canadian crude, having a +40° F. pour point, was dewaxed by passing the feed through 850 g. of 5 A. sieves packed in a bench scale apparatus similar to that shown in FIGURE 1. Sorption conditions were 850° F., atmospheric pressure, and 0.5 w./w./hr. feed rate. By measuring the hydrocarbon gas make with a wet test meter or some other type of flowmeter, sufficient data were obtained to relate the rate of hydrocarbon gas formation with sorption time (shown in FIGURE 3). When the gas make had levelled off to a low rate (in this case, approximately 25 cc./min.) the sieves were considered saturated and the desorptive regenerative part of the cycle commenced.

Example 2

A 545/660° F. virgin gas oil from Pembina crude showing a +40° F. pour point, and a hydrogen gas stream were simultaneously passed through 850 g. of 5 A. sieves. Sorption conditions were 858° F., atmospheric pressure, and 0.5 w./w./hr. feed rate. Hydrogen gas rate was maintained at 1250 std. cc./min. so that the concentration was 65 mol percent in the reactor at the designated sorption conditions. By measuring the hydrocarbon gas make rate (in this case, total gas make rate minus 1250 ml. $H_2$/min.) at periodic sorption time, a similar plot as shown in Example 1, relating gas make rate with sorption time was obtained (FIGURE 4). When the hydrocarbon gas make rate levelled off at about 20 cc./min., the sorption part of the cycle was stopped and regeneration commenced.

Figure 2:
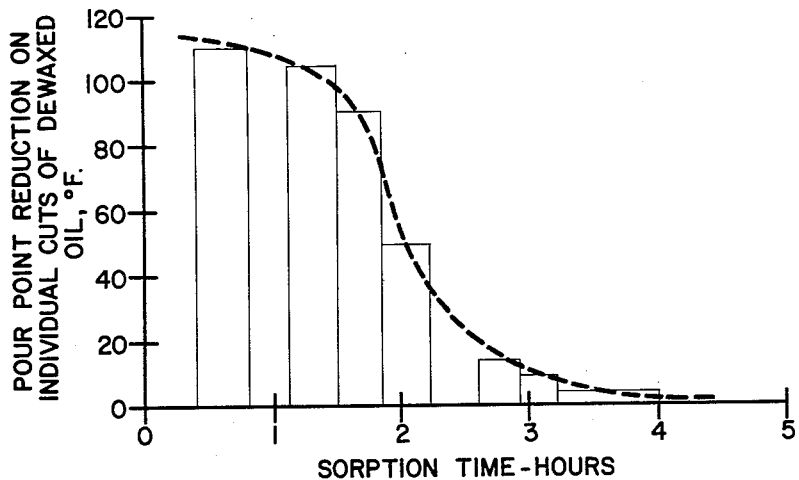
FIGURE 2 is a graphical representation of data relating the pour point reduction of a treated oil with the rate of hydrocarbon make gas production.

Under the sorption conditions employed in Examples 1 and 2, the waxy n-paraffins were cracked upon sorption to lower boiling hydrocarbons. As described earlier, this selective wax cracking phenomenon permitted an appreciable increase in sieve capacity. However, as the sieve cavities became fouled with polymers and other contaminants, the sorbability of the sieves decreased, and consequently the pour point reduction of the treated oil gradually approached zero (FIGURE 2). The rate of hydrocarbon gas make followed a similar trend as the reduction in pour point. At the early stages of the sorption cycle, considerable waxy n-paraffins were sorbed, and under the sorption conditions employed they were converted to low boiling hydrocarbons. Consequently, the rate of hydrocarbon gas make was high. Typical analyses of the make gas were $H_2$ 21.7 mol percent, $CH_4$ 11.3, $C_2H_4$ 6.1, $C_2H_6$ 15.2, $C_3H_6$ 22.1, $C_3H_8$ 14.4, $C_4H_8$ 5.4, $C_4H_{10}$ 3.8. As the sieves became fouled, less n-paraffins were sorbed, resulting in a smaller quantity of light hydrocarbons formed and a lower hydrocarbon gas make rate. When the sieves approached saturation, the rate of gas formation levelled off to a very low rate, which is a measure of the small amount of non-selective cracking of the feed that was occurring during sorption at 850° F.

Comparative data on treating the 560/658° F. virgin gas oil with a hydrogen chloride modified 5 A. sieves are shown in FIGURE 5. Treating conditions were 908° F., atmospheric pressure and 0.6 w./w./hr. feed rate. The 5 A. sieves were modified by initially saturating the sieve cavities with anhydrous hydrogen chloride at 700° F. (11 g./100 g. sieves) before passing the gas oil feed. Thus, with the sieve cavities filled, any gas formation must be due entirely to non-selective cracking of the feed. As can be seen from the data the sieves were essentially ineffective for sorbing n-paraffins. The 5° F. reduction in pour point was due to non-selective cracking of the feed. The hydrocarbon gas make rate curve did not exhibit a maximum that was evident in Examples 1 and 2. Instead, it was a linear relationship; the hydrocarbon gas rate decreasing slowly as the cracking activity of the sieves dropped. If an 850° F. treating temperature were employed instead of 908° F., non-selective cracking of the feed would be reduced considerably. In the absence of selective wax cracking, the hydrocarbon gas make relationship should be similar to that shown in FIGURE 5 but displaced to a much lower value.

What is claimed is:

1. An improved process for dewaxing wax containing hydrocarbon oils which comprises contacting said oil in vapor phase at a temperature of about 800° to 1000° F. with a crystalline metallic alumino-silicate zeolite having a uniform pore opening of about 5 Angstroms in a contacting zone, converting selectively n-paraffins and wax constitutents into lower molecular weight olefins and forming light hydrocarbon gases in said zone, withdrawing the contacted and converted vapors from said zone, condensing the hydrocarbons boiling above 100° F. from said withdrawn vapor stream, separating the uncondensed gases, maintaining said contacting until the rate of said light hydrocarbon gas formation is less than 50 cc. per minute, and thereafter regenerating said metallic alumino-silicate zeolite with an oxygen containing gas.

2. The process of claim 1 wherein said contacting is carried out in the presence of hydrogen.

3. The process of claim 1 wherein said feed is a gas oil boiling in the range of about 450° to 700° F.

4. The process of claim 1 wherein said silicate is a calcium alumino-silicate.

5. An improved process for removing normal paraffins from a hydrocarbon oil containing a mixture of normal paraffins and other hydrocarbons which comprises feeding said oil in vapor phase at a temperature of from about 800° F. to 1000° F. to a conversion zone, contacting said oil in said zone with a crystalline metallic alumino-silicate zeolite having uniform pore openings of about 5 Angstroms to selectively convert normal paraffin constituents into low molecular weight olefins and light hydrocarbon gases which boil below 100° F., withdrawing the treated gaseous oil from said zone, condensing the hydrocarbons of said treated oil which boil above 100° F., separating the uncondensed gases, maintaining the feed to said conversion zone until less than 50 cc. per minute of uncondensed gases are being withdrawn from said conversion zone and thereafter regenerating said metallic alumino-silicate zeolite.

6. The process of claim 1 wherein said oil is contacted with said zeolite in the presence of hydrogen and the feed to said conversion zone is maintained until the uncondensed gases withdrawn from the conversion zone contain less than 50 cc. per minute of said light hydrocarbon gases.

7. The process of claim 5 wherein said oil is a gas oil boiling in the range of from about 100° F. to 750° F.

References Cited in the file of this patent

UNITED STATES PATENTS

| | | |
|---|---|---|
| 1,840,450 | Jaeger et al. | Jan. 12, 1932 |
| 2,378,057 | Yarnall | June 12, 1945 |
| 2,413,134 | Barrer | Dec. 24, 1946 |
| 2,647,076 | Haresnape et al. | July 28, 1953 |
| 2,818,455 | Ballard et al. | Dec. 31, 1957 |
| 2,834,429 | Kinsella et al. | May 13, 1958 |
| 2,859,257 | Hess et al. | Nov. 4, 1958 |
| 2,916,437 | Gilbert | Dec. 8, 1959 |